Figure 3:
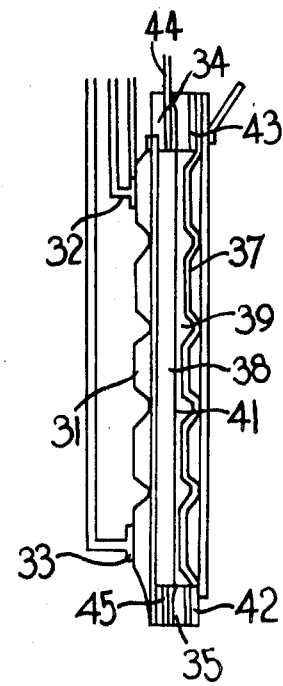

United States Patent

[11] 3,607,423

[72] Inventor Michael Murray Bertioli
Lichfield, England
[21] Appl. No. 853,432
[22] Filed Aug. 27, 1969
[45] Patented Sept. 21, 1971
[73] Assignee Joseph Lucas (Industries) Limited
Birmingham, England
[32] Priority Aug. 27, 1968, May 13, 1969
[33] Great Britain
[31] 40825/68 and 24235/68

[54] RECHARGEABLE HYBRID FUEL CELLS AND
METHOD OF RECHARGING
4 Claims, 8 Drawing Figs.
[52] U.S. Cl. ................................................. 136/86 A
[51] Int. Cl. ...................................................... H01m 27/00
[50] Field of Search ........................................... 136/86

[56] References Cited
UNITED STATES PATENTS
3,219,486  11/1965  Gumcecio .................... 136/86 A
3,359,136  12/1967  Merten et al. ................. 136/86 A Primary Examiner—Winston A. Douglas
Assistant Examiner—H. A. Feeley
Attorney—Holman & Stern ABSTRACT: The invention relates to a hybrid fuel cell having battery plates, oxygen electrode, counterelectrode and electrolyte. Such a cell is charged by connecting the oxygen electrodes and counterelectrodes to a DC source while isolating the oxygen electrodes and counterelectrodes electrically, and the feature of the invention is that the required isolation is effected by supplying gas under pressure to the spaces between the counterelectrodes and oxygen electrodes.

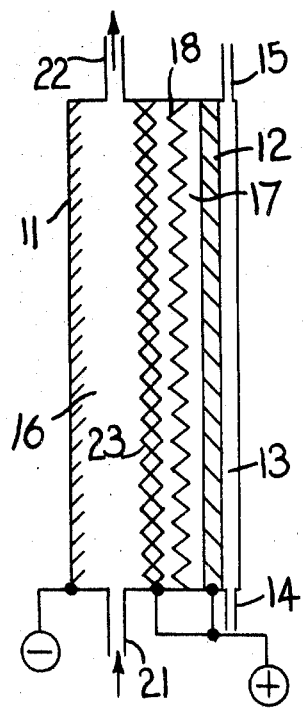
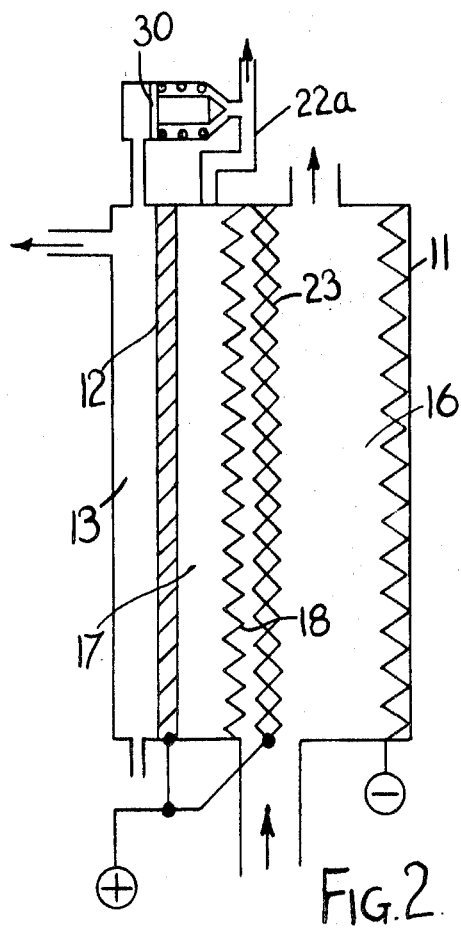

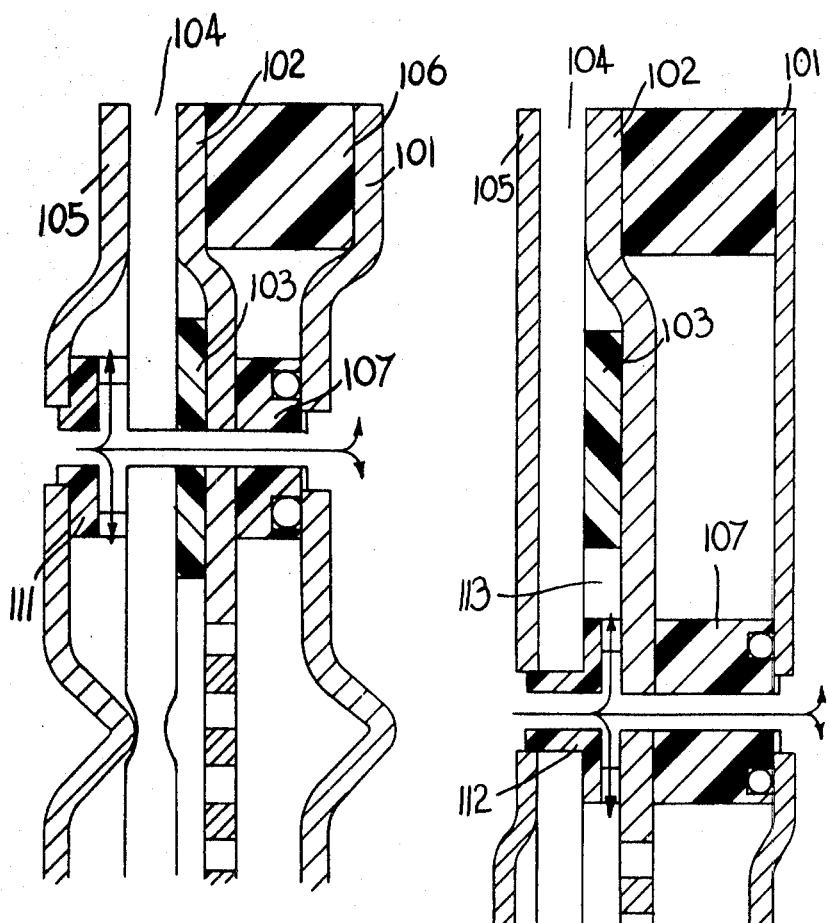

RECHARGEABLE HYBRID FUEL CELLS AND METHOD OF RECHARGING

This invention relates to rechargeable hybrid fuel cells. The hybrid fuel cell can be considered as a fuel cell with the fuel electrode replaced by a battery plate, or an alkaline battery in which one of the battery plates is replaced by an oxygen electrode. The best known example of such an arrangement is the zinc-air battery, with which the invention is particularly concerned. The term "oxygen electrode" is used to mean an electrode in which the active constituent is oxygen, although the gas supplied to the electrode need not be pure oxygen but could, for example, be air. Reference to supply of oxygen should be similarly construed as including any suitable oxygen-containing gas.

In order to charge a hybrid fuel cell, electrolyte is passed through the cell while the electrodes and plates are connected to a DC source. It is found that during this process the oxygen electrode can be damaged, and in order to overcome the difficulty counterelectrodes can be provided in the cell to be used instead of the oxygen electrode during charging. With such an arrangement, steps must be taken to ensure that the oxygen electrodes are not used during charging, and it has been proposed in the past to incorporate in the cell switchgear which ensures that during discharge the oxygen electrodes are operative, but during charging the counterelectrodes and not the oxygen electrodes are operative. The disadvantage of such switchgear is firstly that it is expensive, and secondly that it adds considerably to the weight of the cell, and the object of this invention is to provide a method of recharging a cell without using switchgear. The invention is applicable to hybrid fuel cells with circulating electrolyte or with cells in which the electrolyte is not circulated.

The invention resides in a method of charging a hybrid fuel cell which includes battery plates, oxygen electrodes, counterelectrodes and electrolyte, the oxygen electrodes and counterelectrodes being interconnected electrically, the method comprising connecting the oxygen electrodes and counterelectrodes to a DC source while isolating the oxygen electrodes and counterelectrodes from each other electrically, characterized in that the required isolation is effected by supplying gas under pressure to the spaces between the counterelectrodes and oxygen electrodes. Preferably, but not essentially, the gas used for isolation is the gas supplied to the oxygen electrodes during discharging.

The invention further resides in a hybrid fuel cell having a plurality of individual cells each incorporating a battery plate, an oxygen electrode defining with said plate a chamber for electrolyte, a counterelectrode electrically connected to the oxygen electrode and dividing said chamber into a first chamber between the counterelectrode and plate and a second camber between the counterelectrode and oxygen electrode, means for supplying oxygen to the oxygen electrode during discharging, and means for supplying gas under pressure to said second chamber during charging to isolate the oxygen electrode from the counterelectrode.

Figure 4:
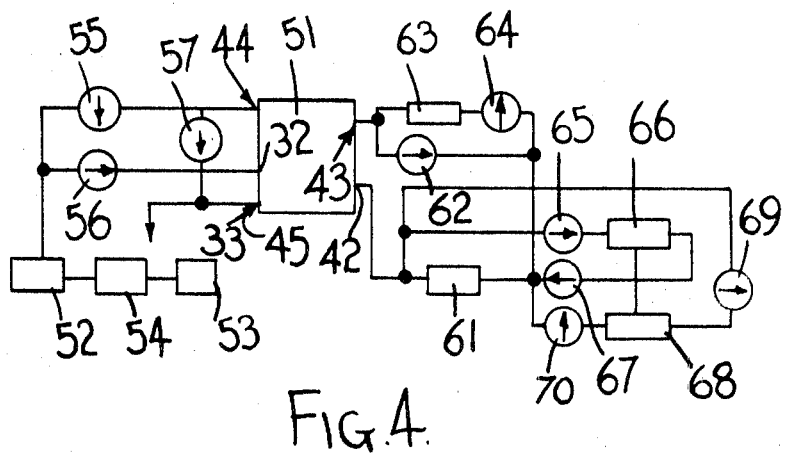
Figure 5:
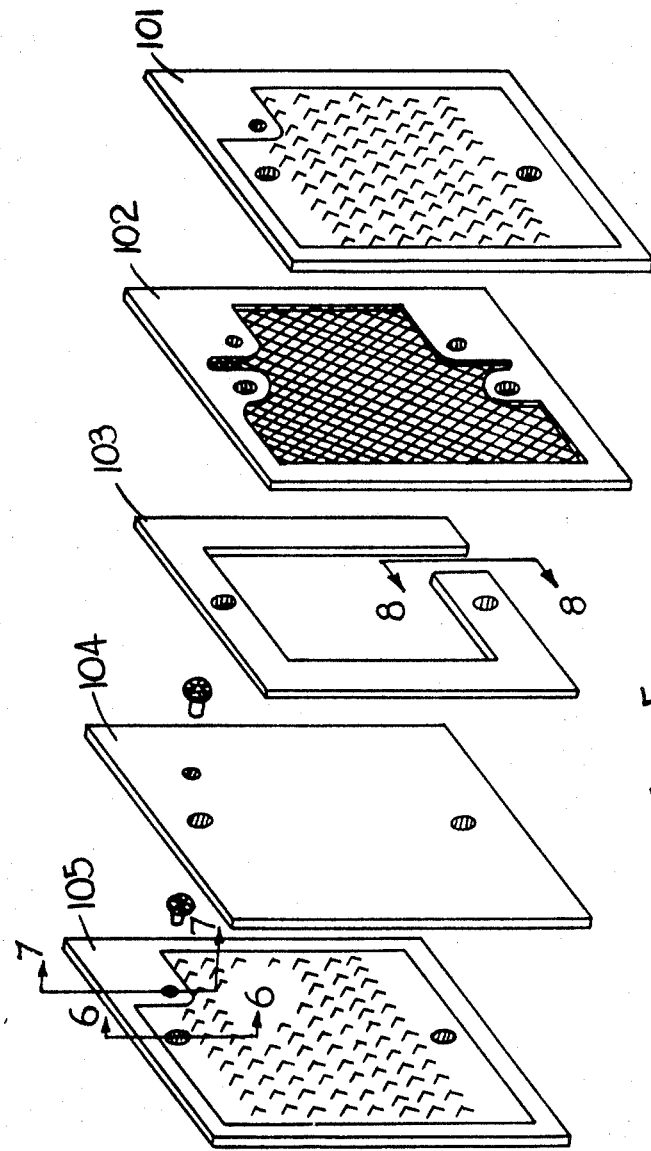
Figure 8:
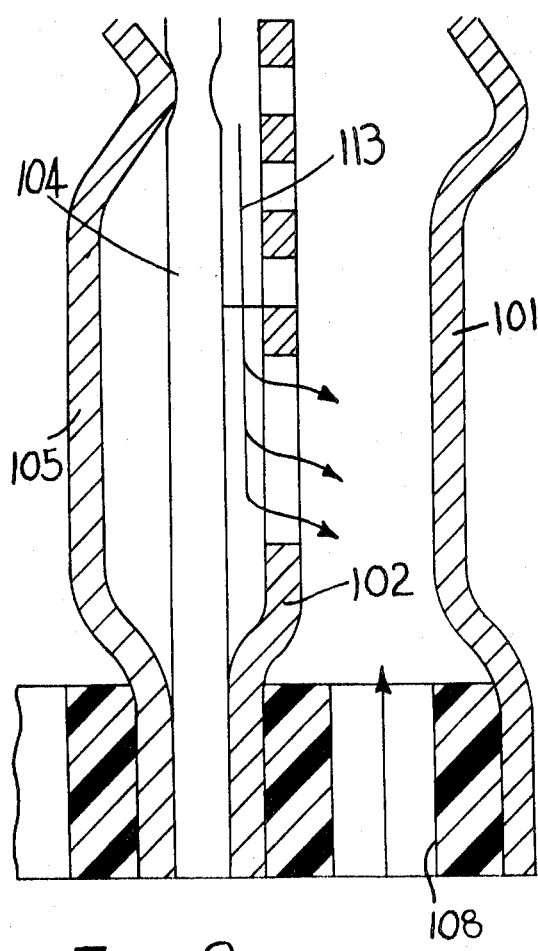

In the accompanying drawings:

FIGS. 1 to 3 respectively and diagrammatic representations of parts of three examples of the invention, FIG. 4 is a block diagram of an overall system, FIG. 5 is an exploded perspective view showing one cell of another example, and FIGS. 6 to 8 respectively are sections on the lines 6—6, 7—7 and 8—8 in FIG. 5 but with the parts assembled.

Referring to FIG. 1, each individual cell of the fuel cell includes a negative electrode 11, typically a zinc electrode, and an oxygen electrode 12, the electrodes dividing the cell into a first chamber 13 having an air inlet 14 and an air outlet 15, and second chamber, which is divided into larger and smaller chambers 16, 17 by a nonconductive porous membrane 18, the chamber 16 having an electrolyte inlet 21 and an electrolyte outlet 22. Within the chamber 16 is a counterelectrode 23, which is electrically connected to the oxygen electrode 12 at all times.

The membrane 18 has smaller pores than the oxygen electrode 12, and during discharge electrolyte is passed through the chamber 16 and also floods the chamber 17, while at the same time air is supplied to the chamber 13. An EMF is then produced between the electrodes 11, 12 in known manner. It is important that there is little or no flow of air through the electrode 12 into the chamber 17, and for this reason the electrode 12 is preferably of the diffusion-operated type in which the airflow is across the surface of the electrode 12.

When it is desired to recharge the cell, the electrodes 11 and 12 are connected to a DC source, and the electrolyte, now containing particles of zinc oxide removed during the discharging process, is again circulated through the chamber 16. However, the pressure in the chamber 13 is increased considerably so that air flows through the electrode 12 into the chamber 17, and effectively isolates the electrode 12 from the counterelectrode 23. In this way, although no switchgear is employed, the oxygen electrode 12 takes no part in the charging process, and is therefore not damaged. It will of course be appreciated that instead of increasing the pressure in the chamber 13, air or other gas could be introduced directly to the chamber 17 as required, suitable valve gear being incorporated. A controlled bleed may be provided from the chamber 17 as required.

The example shown in FIG. 2 is similar to that shown in FIG. 1, and similar parts have been designated with the same reference numerals. In FIG. 2, there is an additional electrolyte outlet 22a which is blocked by a valve 30 when the pressure in the chamber 13 is increased during charging. The valve 30 is so designed that under normal pressure in the chamber 13 during the discharging process, the valve is open so that any air which may pass through the oxygen electrode can flow through the outlet 22a to atmosphere via the electrolyte reservoir, though not of course to the chamber 17. In a typical example using the arrangement shown in FIG. 2 the pore size in a dual oxygen electrode was 10 microns average for the large pores and 5 microns average for the small pores, the electrode material being nickel coated with palladium. The pressure during discharge was 6 p.s.i., but increased to 10 p.s.i. during charging.

Referring now to FIG. 3, the fuel cell consists of a number of individual cells, one of which is shown. The cell includes an oxygen electrode 31 to which air is supplied by way of an inlet 32 and removed by way of an outlet 33. Spacing frame members 34, 35 support the oxygen electrode and also support a zinc battery plate 37 in spaced relationship to the electrode 31. Between the electrode 31 and zinc plates 37 is an electrolyte space which is divided into two chambers 38, 39 by a counterelectrode in the form of a stainless steel mesh 41 trapped between the frame members 34, 35. The inlet 42 and outlet 43 for the electrolyte both open into the chamber 39, and the chamber 38 has an air inlet 44 and an air outlet 45.

When the cell is discharging, the air inlet 44 is vented to atmosphere, and electrolyte fills both chambers 38, 39 of the electrolyte space. Air is supplied to the oxygen electrode and connections are made to the oxygen electrode and zinc plate, the cell operating in conventional manner. The cell is recharged by passing through it electrolyte containing zinc oxide while maintaining a potential between the counterelectrode 41 and the battery plate. During this process air is passed through the chamber 38 is isolate the oxygen electrode, the electrolyte flow now being confined to the chamber 39. The flow of air through the chamber 38 is adjusted so that about one bubble per second issues from the outlet 45. It will of course be appreciated that the frame members 34, 35 are conductive and nonconductive respectively.

Referring now to FIG. 4, the cell is indicated at 51 with its various inlets and outlets numbered in the same way as in FIG. 3. Dealing with the air supply first, an air pump 52 draws air form the atmosphere through a filter 53 and a humidifier 54, and can supply the air to the inlets 44 and 32 under the control respectively of a pair of valves 55 and 56. A further valve 57 can connect the inlet 44 to the outlets 33, 45, which are connected to atmosphere. The valves are shown in the position they occupy during discharge. Thus, the valves 56 and 57 are open, and the valve 55 is closed. The pump 52 supplies air through the valve 56 to the inlet 32, the air escaping through the outlet 33. The valve 57 connects the inlet 44 to atmosphere, thus ensuring that the entire electrolyte space is filled with electrolyte. During charging, the valve 56 closes so that no air is supplied to the inlet 32, the valve 57 also closes and the valve 55 opens so that air is supplied to the inlet 44 as required to isolate the air electrode.

Electrolyte is supplied to the inlet 42 by an electrolyte pump 61, and is returned to the pump 61 either by way of a valve 62 or by way of an air separator 63 in series with another valve 64. Part of the output of the pump 61 can be bypassed through a valve 65, a zinc oxide separator 66 and a valve 67. The separator 66 supplies zinc oxide to a storage tank 68, and a further bypass for the pump 61 can be completed by way of a valve 69, the tank 68 and a valve 70. During discharge, the pump 61 supplies electrolyte to the cell 51, the electrolyte returning by way of the valve 62. At the same time zinc oxide is passed through the separator 66, which provides an input to the tank 68. During charging, the valve 62 closes, so that the return path to the pump 61 is by way of the separator 63 and the valve 64, the separator 63 serving to remove air which can become entrained in the electrolyte by virtue of the air supply to the part 38 of the electrolyte space. During this stage the valves 65 and 67 both close so that the pump does not supply electrolyte to the separator 66, but the valves 69 and 70 open, so that the pump derives zinc oxide from the tank 68 for replating the zinc plate.

In a modification, the invention is used in conjunction with a cell in which the electrolyte is not circulated, but remains within its individual cell, a suitable reservoir being provided for storing electrolyte displaced by the air pressure during charging.

Referring now to the example shown in FIG. 5 to 8, the fuel cell again consists of a number of individual cells, one of which is shown. Each cell includes a nickel-coated mild steel backing plate 101 which on one side is plated with zinc to constitute the zinc electrode, a counterelectrode 102, a spacing frame 103, a porous nickel oxygen electrode 104, and a further nickel-coated mild steel backing plate 105 closing the other end of the cell. Assuming that the cell shown is an intermediate cell, then the other side of the plate 105 constitutes part of the next cell, as does the other side of the plate 101. The parts are supported by a frame 106 together with spacing members 107 incorporating O-rings for providing effective seals where required. The frame 106 incorporates an electrolyte inlet 108 (FIG. 8), and an electrolyte outlet (not shown). During discharging air is supplied to each oxygen electrode by way of diffuser rings 111 (FIG. 6), and during charging, similar diffusion rings 112 (FIG. 7) supply air to the space 113 defined between the counterelectrode 102 and oxygen electrode 104. The air supplied to this space passes through the counterelectrode 102 and bubbles into the electrolyte, the presence of bubbles in the electrolyte leaving the cell indicating that the oxygen electrode is isolated as required.

It will of course be appreciated that the system shown in FIG. 4 can readily be adapted for use with the other arrangements described.

Having thus described my invention what I claim as new and desire to secure by Letters Patent is:

1. A method of charging a hybrid fuel cell which includes a negative electrode and counterelectrode defining a first chamber therebetween containing electrolyte, said first chamber having electrolyte inlet and outlet means, said counterelectrode being spaced from an oxygen electrode for defining a second chamber having gas inlet and gas outlet means, comprising the steps of recycling electrolyte from the outlet means to the inlet means of the first chamber, introducing gas into the inlet means of the second chamber thereby removing electrolyte from the second chamber and isolating the oxygen electrode from the counterelectrode, and connecting the oxygen electrode and counterelectrode to a source of DC.

2. The method as claimed in claim 1 in which the gas is the gas supplied to the oxygen electrode during discharging.

3. A hybrid fuel cell including a negative electrode, a counterelectrode spaced from the negative electrode for defining therewith a first chamber containing electrolyte, said first chamber having electrolyte inlet and outlet means, an oxygen electrode spaced from the counterelectrode for defining therewith a second chamber, said second chamber having inlet and outlet means whereby upon the introduction of gas into the second chamber via the inlet means, the electrolyte is removed from said second chamber, and the oxygen electrode is isolated from the counterelectrode, and means connecting the oxygen electrode and counterelectrode to a source of DC.

4. A method of charging a hybrid fuel cell which includes a consumable negative electrode spaced from a counterelectrode, with said negative electrode and counterelectrode defining a first chamber therebetween containing electrolyte, and having electrolyte inlet and outlet means, said counterelectrode being spaced from an oxygen electrode for defining a second chamber having gas inlet and outlet means, comprising the steps of recycling electrolyte from the outlet means to the inlet means of the first chamber, introducing gas into the inlet means of the inlet means of the second chamber through the oxygen electrode into the second chamber thereby removing electrolyte from the second chamber and isolating the oxygen electrode from the counterelectrode, and connecting the oxygen electrode and counterelectrode to a source of DC.